United States Patent [19]

Iwasaki et al.

[11] Patent Number: 5,831,682

[45] Date of Patent: Nov. 3, 1998

[54] VERTICAL SYNCHRONIZING SIGNAL STABILIZING CIRCUIT, INTEGRATED CIRCUIT AND TELEVISION SIGNAL PROCESSING DEVICE

[75] Inventors: Nobutaka Iwasaki, Kagoshima; Hiroshi Numata, Kanagawa, both of Japan

[73] Assignee: Sony Corporation, Japan

[21] Appl. No.: 701,390

[22] Filed: Aug. 22, 1996

[30] Foreign Application Priority Data

Aug. 30, 1995 [JP] Japan .................................. 7-246615

[51] Int. Cl.⁶ ................................................. H04N 5/10
[52] U.S. Cl. ........................ 348/525; 348/500; 348/529; 348/547
[58] Field of Search .................................. 348/500, 511, 348/525, 529, 533, 547; H04N 5/10

[56] References Cited

U.S. PATENT DOCUMENTS

| | | |
|---|---|---|
| 4,238,770 | 12/1980 | Kobayashi et al. .................... 358/154 |
| 5,031,041 | 7/1991 | Fling ......................................... 358/154 |
| 5,296,928 | 3/1994 | Yamashita et al. ..................... 348/529 |
| 5,469,220 | 11/1995 | Kumada ................................. 348/529 |
| 5,686,968 | 11/1997 | Ujiie et al. ............................. 348/521 |

*Primary Examiner*—Glenton B. Burgess
*Attorney, Agent, or Firm*—Ronald P. Kananen

[57] ABSTRACT

In a vertical synchronizing signal stabilizing circuit, an integrated circuit and a television signal processing device, a vertical synchronizing signal of which period is stabilized can be output with a small number of elements and a simple constitution, without being influenced by the state of the television signal. On the basis of a first distinguish signal which indicates whether there is a separated signal separated from the television signal as the vertical synchronizing signal or not and of a second distinguish signal which indicates whether the period of the separated signal is the standard period or not, the plural states of the separated signal are discriminated, and the processing mode of the separated signal processing circuit is switched on the basis of the result of the discrimination to process the separated signal.

16 Claims, 3 Drawing Sheets

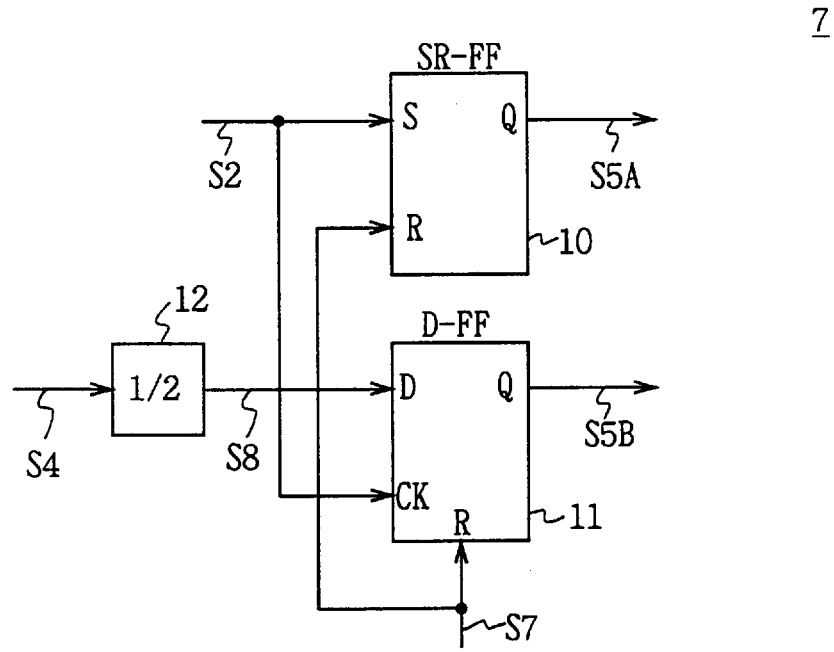
FIG. 4
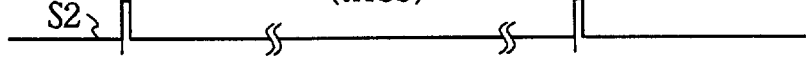

| CURRENT MODE | STATE OF SIGNAL | DETECTION SIGNAL | LATCH DATA | SWITCH OPERATION |
|---|---|---|---|---|
| NONSTANDARD MODE | SIGNALLESS | 0 0 0 0 | 0 0 1 | SIGNALLESS STATE CONTINUING 3V → SINGLLESS MODE |
|  | NOISE | 0 0 0 1 | 0 1 0 | HOLD NONSTANDARD MODE |
|  | SIGNAL | 0 0 1 1 | 0 1 1 | STANDARD STATE 8V → STANDARD MODE |
| STANDARD MODE | SIGNALLESS | 0 1 0 0 | 0 0 1 | SINGLLESS STATE CONTINUING 3V → SIGNALLESS MODE |
|  | NOISE | 0 1 0 1 | 1 0 0 | NOISE CONTINUING 3V → NONSTANDARD MODE |
|  | SIGNAL | 0 1 1 1 | 1 0 1 | HOLD STANDARD MODE |
| SIGNALLESS MODE | SIGNALLESS | 1 0 0 0 | 1 1 0 | HOLD SIGNALLESS MODE |
|  | NOISE | 1 0 0 1 | 1 1 1 | NONSTANDARD MODE |
|  | SIGNAL | 1 0 1 1 | 1 1 1 | NONSTANDARD MODE |

FIG. 6

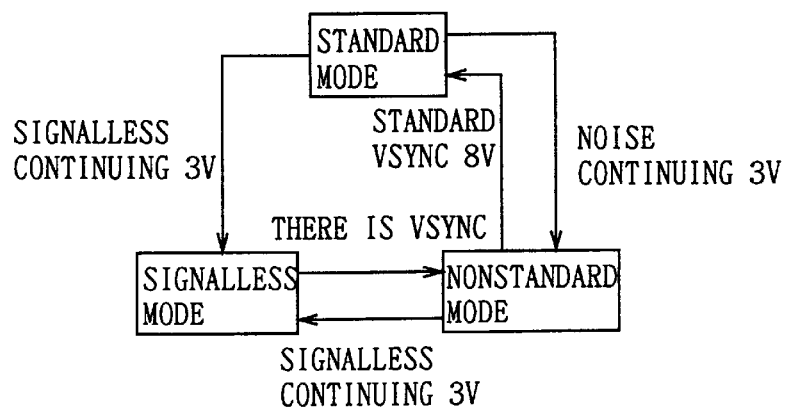

FIG. 7

VERTICAL SYNCHRONIZING SIGNAL STABILIZING CIRCUIT, INTEGRATED CIRCUIT AND TELEVISION SIGNAL PROCESSING DEVICE

BACKGROUND OF THE INVENTION

1. Field of the Invention

This invention relates to a vertical synchronizing signal stabilizing circuit, an integrated circuit and a television signal processing device, and more particularly, is applicable to a synchronizing circuit for separating a synchronizing signal from a television signal of a television receiving device.

2. Description of the Related Art

Heretofore, in this type of a synchronizing circuit, a vertical synchronizing signal which has been separated from a television signal is stabilized by a vertical synchronizing signal stabilizing circuit, therefore, occurrence of vertical shifting of a screen which is due to a jitter or miss of the vertical synchronizing signal is suppressed.

For instance, a synchronizing circuit 1 shown in FIG. 1 gives a television signal S1 to a vertical synchronous separation circuit 2 to separate a vertical synchronizing signal S2, and then inputs the vertical synchronizing signal S2 to a vertical synchronizing signal stabilizing circuit 3. The vertical synchronizing signal stabilizing circuit 3 is comprised of a count-down processor which is composed of a digital signal processor (DSP) formed by C-MOS integrated circuit, and the circuit 3 calculation-processes the vertical synchronizing signal S2 with the DSP.

At this point, in accordance with the state of the television signal S1, that is, in accordance with whether the television signal S1 is the standard signal which has been obtained on a sufficient electric field strength or a weak electric field strength or whether the television signal S1 is the signal which has been obtained by special reproduction of the video tape recorder, the vertical synchronizing signal stabilizing circuit 3 freely changes the detecting range (of the period) and operates, so as to perform interpolation with respect to miss of the vertical synchronizing signal S2 and to eliminate influence of a noise.

Thereby, the vertical synchronizing signal stabilizing circuit 3 steadily follows to the vertical synchronizing signal S2 without reference to the state of the television signal S1, and outputs a vertical synchronization timing pulse S3 of which period has been stabilized.

However, in the aforementioned vertical synchronizing signal stabilizing circuit 3 which has been composed of the DSP, there has been such a problem that the number of elements is increased and the integrated circuit is enlarged. On the other hand, in some cases, a vertical synchronizing signal stabilizing circuit is composed of only analog circuits in order to diminish the number of elements.

In the analog vertical synchronizing signal stabilizing circuit, the follow-up range (of the period) of the vertical synchronizing signal is fixed to one range, and vertical synchronizing signals which have the deviated periods are ignored. Besides, in the analog vertical synchronizing signal stabilizing circuit, the follow-up range of it is set to a wide value, in order to give it followability toward the synchronizing signal of the time of special reproduction of video tape recorders.

Accordingly, there has been such a disadvantage that the property of stabilizing the vertical synchronizing signal coping with a miss of the vertical synchronizing signal or a noise of the time when the standard television signal has been input is worse than that of the case of processing with the DSP.

SUMMARY OF THE INVENTION

In view of the foregoing, an object of this invention is to provide a vertical synchronizing signal stabilizing circuit, an integrated circuit and a television signal processing device, in which a vertical synchronizing signal of which period is stabilized can be output with small number of elements and a simple constitution, without reference to the state of the television signal.

The foregoing object and other objects of the invention have been achieved by the provision of a vertical synchronizing signal stabilizing circuit, comprises: separated signal processing means for receiving a separated signal which has been separated from a television signal as a vertical synchronizing signal, processing the separated signal and generating the vertical synchronizing signal; distinguish means for receiving the separated signal, and for distinguishing whether the separated signal exists or not and outputting first distinguish signal, and for distinguishing whether the period of the separated signal is the standard period of the synchronizing signal or not and outputting second distinguish signal; and control means for determining the plural states of the separated signal on the basis of the first and second distinguish signals, and for controlling the separated signal processing means on the basis of the result of the discrimination.

The plural states of the separated signal are discriminated on the basis of the first and the second distinguish signals, and the processing mode of the separated signal processing means is switched on the basis of the result of the discrimination, and then the separated signal is processed, so that the vertical synchronizing signal of which period is stabilized without reference to the state of the television signal can be outputted with small number of elements and a simple constitution.

Additionally, in the present invention, a television signal processing device including an integrated circuit in which a vertical synchronizing signal stabilizing circuit is formed on a semiconductor substrate is provided. The vertical synchronizing signal stabilizing circuit comprises: separated signal processing means for receiving a separated signal which has been separated from a television signal as a vertical synchronizing signal and processing the separated signal so as to generate the vertical synchronizing signal; distinguish means for receiving the separated signal, and for distinguishing whether or not there is the separated signal and outputting a first distinguish signal, and also for distinguishing whether or not the period of the separated signal is the standard period of the vertical synchronizing signal and outputting a second distinguish signal; and control means for discriminating the plural states of the separated signal on the basis of the first and the second distinguish signals, and for controlling the separated signal processing means on the basis of the result of the discrimination.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 4 is a connection diagram showing the distinguish circuit;

FIGS. 5A to 5E are timing charts showing the timing of the respective signals of the time when the vertical synchronizing signal is distinguished;

FIG. 6 is a table of converting the current processing mode and the result of the distinguishment into the latch data; and FIG. 7 is a schematic diagram showing the procedure of automatic mode switching.

DETAILED DESCRIPTION OF THE INVENTION

Figure 1:
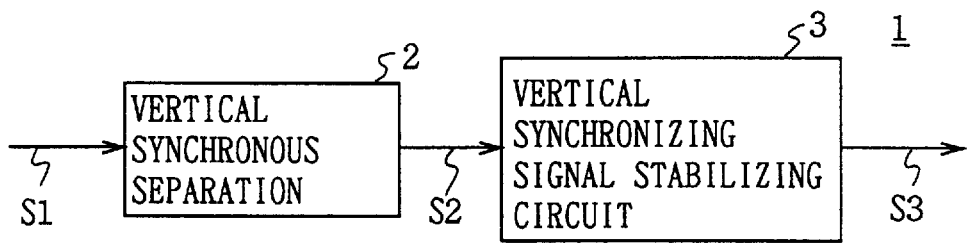
FIG. 1 is a block diagram showing the conventional synchronizing circuit.
Figure 2:
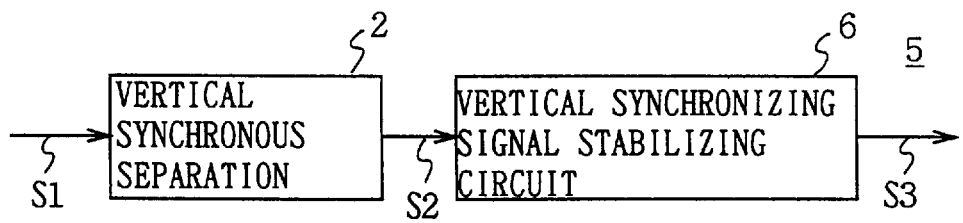
FIG. 2 is a block diagram illustrating the synchronizing circuit of an embodiment of a vertical synchronizing signal stabilizing circuit, an integrated circuit and a television signal processing device according to the present invention.

Preferred embodiments of this invention will be described with reference to the accompanying drawings:

In FIG. 2 where the same reference numerals are applied to parts corresponding to FIG. 1, the numeral 5 shows, as a whole, a television signal processing device, for instance, a synchronizing circuit of a television receiver. The synchronizing circuit 5 has integrated circuit structure which is based on integrated-injection logic (IIL), and a vertical synchronizing signal stabilizing circuit 6 is located therein, in place of a vertical synchronizing signal stabilizing circuit 3 out of the components of the conventional synchronizing circuit 1.

At the time of processing the separated signal which has been separated from the television signal S1, for instance, a vertical synchronizing signal S2, the vertical synchronizing signal stabilizing circuit 6 adaptively switches and selects out of two processing modes of which follow-up ranges have been fixed and a processing mode for an occasion when the vertical synchronizing signal S2 does not exist.

Thereby, when the period of the vertical synchronizing signal S2 has fluctuated or a noise has gotten mixed therein owing to a weak electric field reception or a special reproduction of a video tape recorder, etc., the vertical synchronizing signal stabilizing circuit 6 outputs a vertical synchronizing timing pulse S3 of which period has been stabilized, ignoring unnecessary signals, so that a sense of unevenness of the screen which is due to disturbance of the vertical synchronization is eliminated.

Figure 3:
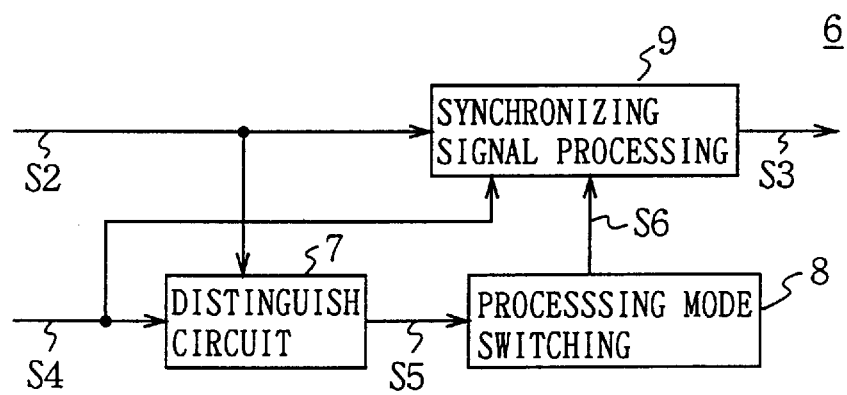
FIG. 3 is a block diagram showing the vertical synchronizing signal stabilizing circuit according to the embodiment.

As shown in FIG. 3, in the vertical synchronizing signal stabilizing circuit 6, the vertical synchronizing signal S2 and a clock signal S4 of which frequency is twice that of the horizontal synchronizing signal based on the standard television signal are input to a distinguishing means, for instance, a distinguish circuit 7.

The distinguish circuit 7 distinguishes if the vertical synchronizing signal S2 exists. Under setting of the detecting term based on the clock signal S4, the distinguish circuit 7 moreover distinguishes whether the period of the vertical synchronizing signal S2 is the standard period or not. The distinguish circuit 7 gives a distinguish signal S5 which shows the result of the distinguishment to a controlling means, for instance, a processing mode switching circuit 8.

The processing mode switching circuit 8 discriminates the three states of the vertical synchronizing signal S2, on the basis of the distinguish signal S5. In other words, the processing mode switching circuit 8 discriminates whether it is the standard-period vertical synchronizing signal S2, a signal such as a noise which includes the nonstandard-period vertical synchronizing signal S2, or a signalless state. When the same results of the discrimination have been repeatedly counted during the stated waiting time, the processing mode switching circuit 8 switches among the follow-up modes such as the nonstandard signal mode and the standard signal mode, and the interpolation mode such as the signalless mode, in accordance with the current processing mode which has been commanded to a separated signal processing means, for instance, a synchronizing signal processing circuit 9 and the result of the discrimination, so that the new processing mode is determined.

The processing mode switching circuit 8 gives the control signal S6 which indicates the processing mode to the synchronizing signal processing circuit 9.

Thereby, the processing mode switching circuit 8 causes the synchronizing signal processing circuit 9 to maintain the current processing mode until the waiting time is over, even if the state of the vertical synchronizing signal S2 is changed. Therefore, the processing mode switching circuit 8 is able to prevent a malfunction which is due to a short-time fluctuation of the state of the vertical synchronizing signal S2, and to suppress a feeling of unevenness of the screen to the same level as that of the processing based on a DSP.

In this connection, the processing mode switching circuit 8 is able to fix the processing mode to the nonstandard signal mode, under the external controlling.

The synchronizing signal processing circuit 9 switches and selects a processing mode out of the three processing modes, in accordance with the control signal S6. In this way, the synchronizing signal processing circuit 9 processes the vertical synchronizing signal S2 through the nonstandard signal mode, the standard signal mode, or the signalless mode, and outputs the vertical synchronizing timing pulse S3 of which period is constant and of which jitter due to a noise or a miss of the vertical synchronizing signal S2 is suppressed to minimum.

That is, when the standard signal mode has been commanded, the synchronizing signal processing circuit 9 outputs the vertical synchronizing timing pulse S3 which follows only the standard vertical synchronizing signal S2 having the period range of 261.5 [H] to 263.5 [H], where [H] is the period of the horizontal synchronizing signal. If the vertical synchronizing signal S2 do not exist within the range of 261.5 [H] to 263.5 [H], then the vertical synchronizing timing pulse S3 having the period of 263.5 [H] is outputted.

When the nonstandard signal mode has been commanded, the synchronizing signal processing circuit 9 outputs the vertical synchronizing timing pulse S3 which follows only the vertical synchronizing signal S2 having the period range of 238.5 [H] to 286.5 [H]. If the vertical synchronizing signal S2 do not exist within the range of 238.5 [H] to 286.5 [H], then the vertical synchronizing timing pulse S3 having the period of 286.5 [H] is output.

When the signalless mode has been commanded, the synchronizing signal processing circuit 9 performs interpolation at the timing of miss of the vertical synchronizing signal S2, so that the vertical synchronizing timing pulse S3 having the period of 262.5 [H] is output.

As shown in FIG. 4, the distinguish circuit 7 gives the vertical synchronizing signal S2 and the reset signal S7 to a set terminal (denoted by S, in the figure) and a reset terminal (denoted by R, in the figure) of a SR flip flop 10, respectively.

By this, in the SR flip flop 10, a first detecting term which has a term equal to the standard vertical synchronizing term is set, with the reset signal S7. The SR flip flop 10 distinguishes whether there is any signal including the vertical synchronizing signal S2 or not, and outputs a first distinguish signal which represents the result of the distinguishment, for instance, a distinguish signal S5A, for every first detecting term.

Moreover, the distinguish circuit 7 gives a standard signal detecting pulse S8 which has been obtained by ½ dividing of the clock signal S4, the vertical synchronizing signal S2, and the reset signal S7 to a delay terminal (denoted by D, in the figure), a clock terminal (denoted by CK, in the figure), and a reset terminal of a D flip flop 11, respectively. Thereby, in the D flip flop 11, a second detecting term is set to 261.5 [H] to 263.5 [H], on the basis of the term of logic [1] of the standard signal detecting pulse S8.

The D flip flop 11 detects whether there is the vertical synchronizing signal S2 within the second detecting term or not, and then distinguishes whether the period of the vertical synchronizing signal S2 is the standard period or not. The D flip flop 11 outputs a second distinguish signal which represents the result of the distinguishment, for instance, a distinguish signal S5B.

Thus, the distinguish circuit 7 outputs the distinguish signals S5A and S5B to the processing mode switching circuit 8, as the distinguish signal S5.

The SR flip flop 10 and the D flip flop 11 operate with the timing shown in FIGS. 5A to 5E.

That is, in the case where the vertical synchronizing signal S2 exists within the second detecting term, the SR flip flop 10 generates the distinguish signal S5A which rises to the logic [1] level concurrently with the vertical synchronizing signal S2, and indicates that some signal including the vertical synchronizing signal S2 has been inputted. Moreover, the D flip flop 11 generates the distinguish signal S5B which rises to the logic [1] level concurrently with the vertical synchronizing signal S2 during the term of the logic [1] level of the standard signal detecting pulse S8, and indicates that the period of the vertical synchronizing signal S2 is the standard period.

In the case where the vertical synchronizing signal S2 has been missed, the SR flip flop 10 generates the distinguish signal S5A which remains still at the logic [0] level, and indicates that any signal has been not inputted at all. Moreover, the D flip flop 11 also generates the distinguish signal S5B which remains still at the logic [0] level.

In the case where the vertical synchronizing signal S2 exists on the outside of the second detecting term, the SR flip flop 10 generates the distinguish signal S5A which rises to the logic [1] level concurrently with the vertical synchronizing signal S2, and indicates that some signal including the vertical synchronizing signal S2 has been inputted. Moreover, the D flip flop 11 generates the distinguish signal S5B which remains still at the logic [0] level because the vertical synchronizing signal S2 exists on the outside of the second detecting term, and indicates that the period of the vertical synchronizing signal S2 is the nonstandard period of, for instance, 238.5 [H] to 286.5 [H].

On the above construction, as shown in the data translation table of FIG. 6, the processing mode switching circuit 8 inputs the current processing mode which is being indicated to the synchronizing signal processing circuit 9, as a first and a second bits of the detection signal which is comprised of four bits, for example. Moreover, the processing mode switching circuit 8 inputs the state of the vertical synchronizing signal S2 which has been discriminated on the basis of the distinguish signal S5, as a third and a forth bits of this detection signal.

The first and the second bits of the detection signal represent the nonstandard mode, the standard mode and the signalless mode with "00", "01" and "10", respectively. The third and the forth bits represent a signalless state, a signal such as a noise which includes the nonstandard-period vertical synchronizing signal S2, and the standard-period vertical synchronizing signal S2 with "00", "01" and "11", respectively.

The processing mode switching circuit 8 converts the detection signal into a latch data of three bits, and switches to the new processing mode if the latch data have been repeatedly counted within the stated waiting time.

That is, at the time of the nonstandard mode, if the signalless state, any signal such as a noise, and the standard-period vertical synchronizing signal S2 are respectively inputted, then the processing mode switching circuit eight obtains the latch data which are comprised of "001", "010" and "011", respectively.

If the latch data of "001" has been continuously counted within the waiting time which is corresponding to three periods (denoted by 3V, in the figure) of the reset signal S7, the processing mode switching circuit 8 then switches to the signalless mode. While, if the latch data which is comprised of "010" has been counted, then the processing mode switching circuit 8 maintains the nonstandard mode.

On the other hand, if the latch data which is comprised of "011" has been counted within the waiting time which is corresponding to eight periods (denoted by 8V, in the figure) of the reset signal S7, the processing mode switching circuit 8 then switches to the standard mode. However, in the course of counting of the latch data of "011", if the signal of the other state which covers 3V has been continuously discriminated, the processing mode switching circuit 8 then resets the counting operation.

Next, at the time of the standard mode, if the signalless state, a signal such as a noise, and the standard-period vertical synchronizing signal S2 are respectively inputted, then the processing mode switching circuit 8 obtains the latch data which are comprised of "001", "100" and "101", respectively.

If the latch data of "001" has been continuously counted within the waiting time which is corresponding to 3V, the processing mode switching circuit 8 then switches to the signalless mode. While, if the latch data which is comprised of "100" has been continuously counted within the waiting time which is corresponding to 3V, then the processing mode switching circuit 8 switches to the nonstandard mode. Moreover, if the latch data which is comprised of "101" has been counted, then the processing mode switching circuit 8 maintains the standard mode.

Next, at the time of the signalless mode, if the signalless state, a signal such as a noise, and the standard-period vertical synchronizing signal S2 are respectively inputted, then the processing mode switching circuit 8 obtains the latch data which are comprised of "110", "111" and "111", respectively.

If the latch data which is comprised of "110" has been counted, then the processing mode switching circuit 8 maintains the signalless mode. If the latch data which is comprised of "111" has been counted, then the processing mode switching circuit 8 switches to the nonstandard mode, without waiting time.

In this way, as shown in FIG. 7, at the time of processing the vertical synchronizing signal S2, the synchronizing signal processing 9 is only required to suitably switch to the nonstandard signal mode of which follow-up range is fixed and wide, the standard signal mode of which follow-up range is fixed and narrow, and the signalless mode for interpolating the missed vertical synchronizing signal, by the control signal S6.

Hereby, the vertical synchronizing signal stabilizing circuit 6 is able to output the vertical synchronizing timing pulse S3 which has the same stability as the usual, with the more simple circuit than that of the past, without being influenced by the state of the television signal S1. Therefore, the synchronizing circuit 5 is able to remarkably diminish the number of the elements.

According to the above constitution, three kinds of the state of the vertical synchronizing signal S2 are discriminated on the basis of the distinguish signal S5A which is indicating whether the vertical synchronizing signal S2 exists or not and the distinguish signal S5B which is indicating whether the period of the vertical synchronizing signal S2 is the standard period or not, and the two processing modes of which follow-up ranges have been fixed and the processing mode for the time of signalless are adaptively switched to, in accordance with the current processing mode and the discriminated state of the vertical synchronizing signal S2, and then the vertical synchronizing signal S2 is processed; so that the vertical synchronizing timing pulse S3 of which period is stabilized can be outputted, with the remarkably decreased number of elements and the simple construction, without being influenced by the state of the television signal S1.

While in the aforesaid embodiment, the waiting time is set to 3V or 8V, the present invention is not limited thereto and the waiting time can be arbitrary set, for instance, the waiting time can be adaptively adjusted in accordance with the state of the vertical synchronizing signal. In this case, the same effect can be obtained.

Further, while in the aforesaid embodiment, the vertical synchronizing signal stabilizing circuit 6 is built into an integrated circuit together with the vertical synchronization separating circuit, the present invention is not limited thereto and the vertical synchronizing signal stabilizing circuit can be built into an integrated circuit together with arbitrary circuits.

Furthermore, while in the aforesaid embodiment, the present invention is applied to the synchronizing circuit of the television receiver, the present invention is not limited thereto and a vertical synchronizing signal which has been separated from a television signal can be processed with a vertical synchronizing signal stabilizing circuit of a television signal processing device, for instance, a video tape recorder, so as to generate the vertical synchronizing signal of which period has been stabilized.

As described above, according to the present invention, by discriminating the plural states of the separated signal on the basis of the first distinguish signal which indicates whether there is the separated signal separated from the television signal as the vertical synchronizing signal or not and the second distinguish signal which indicates whether the period of the separated signal is the standard period or not, switching the processing mode of the separated signal processing means on the basis of the result of the discrimination, and then processing the separated signal, it is able to realize a vertical synchronizing signal stabilizing circuit and a television signal processing device which can output a vertical synchronizing signal of which period is stabilized without reference to the state of the television signal, with a remarkably decreased number of elements and a simple constitution.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A vertical synchronizing signal stabilizing circuit comprising:

separated signal processing means for receiving a separated signal which has been separated from a television signal as a vertical synchronizing signal and processing said separated signal to generate the vertical synchronizing signal;

distinguish means for receiving said separated signal, and for distinguishing whether there is said separated signal or not to output a first distinguish signal, and also for distinguishing whether the period of said separated signal is a standard period of said vertical synchronizing signal or not to output a second distinguish signal; and control means for discriminating plural states of said separated signal on the basis of said first and second distinguish signals, and for controlling said separated signal processing means on the basis of the result of the discrimination.

2. The vertical synchronizing signal stabilizing circuit according to claim 1, wherein said separated signal processing means has a follow-up mode following said separated signal having a period of a definite range, processes said separated signal followed in said follow-up mode, and generates said vertical synchronizing signal having the period which is according to said follow-up mode.

3. The vertical synchronizing signal stabilizing circuit according to claim 2, wherein said separated signal processing means has an interpolation mode interpolating with said vertical synchronizing signal having the definite period the term in which said separated signal do not exist, switches and selects between said interpolation mode and said follow-up mode, processes said separated signal with the selected mode, and generates said vertical synchronizing signal having the period which is according to the selected mode.

4. The vertical synchronizing signal stabilizing circuit according to claim 2, wherein said synchronizing signal processing means has a plurality of said follow-up modes in which the widths of said ranges are different each other, switches and selects a mode out of the plural follow-up modes, processes said separated signal with the selected mode, and generates said vertical synchronizing signal having the period which is according to the selected mode.

5. The vertical synchronizing signal stabilizing circuit according to claim 1, wherein said control means receives a clock signal having a definite period, and distinguishes whether the period of said separated signal is said standard period or not on the basis of said clock signal.

6. The vertical synchronizing signal stabilizing circuit according to claim 1, wherein said distinguish means determines the mode which is set in said separated signal processing means, in accordance with the mode which is currently set in said separated signal processing means and the result of said discrimination, and controls said separated signal processing means in accordance with the result of the determination.

7. The vertical synchronizing signal stabilizing circuit according to claim 1, wherein said control means determines the mode which is set in said separated signal processing means, when identical results of said discrimination have been repeatedly obtained in a stated term, and controls said separated signal processing means in accordance with the result of the determination.

8. The vertical synchronizing signal stabilizing circuit according to claim 6, wherein said control means determines the mode which is set said separated signal processing means when identical results of said discrimination have been repeatedly obtained in a stated term, and controls said separated signal processing means in accordance with the result of the determination.

9. A television signal processing device comprising an integrated circuit in which a vertical synchronizing signal stabilizing circuit is formed on a semiconductor substrate, said vertical synchronizing signal stabilizing circuit comprising:

separated signal processing means for receiving a separated signal that has been separated from a television signal as a vertical synchronizing signal and for processing said separated signal to generate the vertical synchronizing signal;

distinguish means for receiving said separated signal, for distinguishing whether there is said separated signal or not to output a first distinguish signal, and also for distinguishing whether the period of said separated signal is the standard period of said vertical synchronizing signal or not to output a second distinguish signal; and control means for discriminating plural states of said separated signal on the basis of said first and second distinguish signals, and for controlling said separated signal processing means on the basis of the result of the discrimination.

10. The television signal processing device according to claim 9, wherein said separated signal processing means has a follow-up mode following said separated signal having a period of a definite range, processes said separated signal followed in said follow-up mode, and generates said vertical synchronizing signal of the period which is according to said follow-up mode.

11. The television signal processing device according to claim 10, wherein said separated signal processing means has an interpolation mode interpolating with said vertical synchronizing signal having the definite period the term in which said separated signal do not exist, switches and selects between said interpolation mode and said follow-up mode, processes said separated signal with the selected mode, and generates said vertical synchronizing signal of the period which is according to the selected mode.

12. The television signal processing device according to claim 10, wherein said synchronizing signal processing means has a plurality of said follow-up modes in which widths of said ranges are different each other, switches and selects a mode among the plural follow-up modes, processes said separated signal with the selected mode, and generates said vertical synchronizing signal of the period which is according to the selected mode.

13. The television signal processing device according to claim 9, wherein said control means receives a clock signal of a definite period, and distinguishes whether the period of said separated signal is said standard period or not on the basis of said clock signal.

14. The television signal processing device according to claim 9, wherein said distinguish means determines the mode which is set in said separated signal processing means, in accordance with the mode which is currently set in said separated signal processing means and the result of said discrimination, and controls said separated signal processing means in accordance with the result of the determination.

15. The television signal processing device according to claim 9, wherein said control means determines the mode which is set in said separated signal processing means, when identical results of said discrimination have been repeatedly obtained in a stated term, and controls said separated signal processing means in accordance with the result of the determination.

16. The television signal processing device according to claim 14, wherein said control means determines the mode which is set in said separated signal processing means when the identical results of said discrimination have been repeatedly obtained in the stated term, and controls said separated signal processing means in accordance with the result of the determination.

* * * * *